United States Patent
Abrahams et al.

(10) Patent No.: US 8,739,132 B2
(45) Date of Patent: May 27, 2014

(54) METHOD AND APPARATUS FOR ASSESSING LAYERED ARCHITECTURE PRINCIPLES COMPLIANCE FOR BUSINESS ANALYTICS IN TRADITIONAL AND SOA BASED ENVIRONMENTS

(75) Inventors: Faried Abrahams, Laytonsville, MD (US); Kerard R. Hogg, Riddells Creek (AU); Sandeep R. Patil, Elmsford, NY (US); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 13/561,160

(22) Filed: Jul. 30, 2012

(65) Prior Publication Data

US 2014/0032276 A1 Jan. 30, 2014

(51) Int. Cl.
*G06F 9/44* (2006.01)
(52) U.S. Cl.
USPC ............ 717/126; 717/124; 717/127; 717/128
(58) Field of Classification Search
None
See application file for complete search history.

(56) References Cited

U.S. PATENT DOCUMENTS

| | | | | |
|---|---|---|---|---|
| 8,359,566 B2 * | 1/2013 | Chaar et al. | ................... | 717/101 |
| 8,386,524 B2 * | 2/2013 | Abrahams et al. | ............ | 707/793 |
| 8,504,990 B2 * | 8/2013 | Klein et al. | ................ | 717/125 |
| 2008/0022257 A1 * | 1/2008 | Baartman et al. | ............ | 717/106 |
| 2009/0158237 A1 * | 6/2009 | Zhang et al. | .................. | 717/100 |
| 2011/0126219 A1 | 5/2011 | Singh et al. | | |
| 2012/0317591 A1 * | 12/2012 | Samson | ........................ | 719/330 |
| 2012/0324069 A1 * | 12/2012 | Nori et al. | ..................... | 709/222 |

* cited by examiner

*Primary Examiner* — Isaac Tecklu
(74) *Attorney, Agent, or Firm* — DeLio, Peterson & Curcio, LLC; Kelly M. Nowak; Ronald Kaschak

(57) ABSTRACT

Computer-implemented methods, computer program products and computer systems that assess business logic architecture compliance by defining an ideal business logic architecture hierarchy of a desired application, retrieving one or more applications from a data repository, breaking down these applications into a plurality of processes and analyzing the plurality of processes for common inter-application processes. Common inter-application processes are located and store in the middleware layer. The desired application is developed using the applications and common inter-application processes from the middleware layer to provide a resultant application, followed by determining an actual business logic hierarchal structure of the resultant application. This actual business logic hierarchal structure of the resultant application is compared against the ideal business logic architecture hierarchy to calculate compliance thereof, which in turn, reflects the maturity level of the developed resultant application.

20 Claims, 4 Drawing Sheets

METHOD AND APPARATUS FOR ASSESSING LAYERED ARCHITECTURE PRINCIPLES COMPLIANCE FOR BUSINESS ANALYTICS IN TRADITIONAL AND SOA BASED ENVIRONMENTS

TECHNICAL FIELD

The present invention relates generally to software architectural models, and more specifically, to assessing layered architecture principles compliance for business analytics in traditional and Service-Oriented Architecture (SOA) based environments.

BACKGROUND

Many of today's business applications require complex software architectural models and systems. For instance, Service-Oriented Architecture (SOA) software environments provide interoperable services that support a variety of an organization's business objectives and processes. SQA provides for the designing, development and building of software code and/or data structures that provide services in the form of well-defined business functionalities. SOA also provides a way for consumers of services, which are typically web-based applications, to be aware of available SOA-based services.

The SOA platform separates functions into services that are made accessible over a network for allowing end-users to combine, share and reuse services in the production of applications. The services are typically unassociated data structures (i.e., applications) that have no embedded subroutines to other data structures (i.e., other applications). Each service is composed of software code and/or data structures, and includes metadata that describes the characteristics of each service, as well as its code/data that drives the particular service. Users can select and string together either small or large segments of services based on their functionality to form ad hoc applications. In doing so, these ad hoc applications are built almost entirely from existing software services.

Current versions of SOA allow new applications to be developed for publication as a Web service into a service registry. Alternatively, new versions of SOA allow existing software applications to be wrapped with a service-compliant interface, and then published as a Web service. Service-compliant interfaces are known as middleware layer software products that bridge the gap between existing software applications and new applications under development. They are used by end-users to create new applications by integrating existing applications with other applications. One such example of a service wrapping and development platform is IBM's WebSphere.

However, since SOA solutions continue to be implemented in an ad hoc basis, rather than in a systematic manner, the design and development of reusable services and service components remain to be a challenge. Additionally, SOA solutions are heavy weighted modeling processes requiring use of numerous reusable services and service components that often overlap one another, or even replicate each other during the design and development stages of creating new applications. This overlap and replication generates competing platforms in the design and creation stage of such applications, which ultimately detrimentally slows down the development and use thereof. Also, the overlap and/or replication of processes and sub-processes within such new applications wastes valuable human resources, thereby leading to increased operating expenditures. There is also no assurance that the resultant application created using SOA modeling conforms with the application desired by the end-user or the hierarchial structure of such desired application.

Accordingly, there continues to be a need for improved SOA modeling approaches that efficiently, cost effectively and accurately generate applications that meet desired end goals and conform to hierarchial architecture structure.

SUMMARY

According to one embodiment of the present invention, the invention is directed to a method of assessing business logic architecture compliance by defining an ideal business logic architecture hierarchy of a desired application, retrieving one or more applications from a data repository, breaking down these applications into a plurality of processes and analyzing the plurality of processes for common inter-application processes. Common inter-application processes are located and store in the middleware layer. The desired application is developed using the applications and common inter-application processes from the middleware layer to provide a resultant application, followed by determining an actual business logic hierarchal structure of the resultant application. This actual business logic hierarchal structure of the resultant application is compared against the ideal business logic architecture hierarchy to calculate compliance thereof, which in turn, reflects the maturity level of the developed resultant application.

In one or more embodiments the business logic architecture may be a service-oriented architecture. The plurality of applications may be retrieved from the data repository to develop the desired application. Further, the one or more applications may also be broken down into sub-processes that are analyzed for common inter-application processes, which are used to build the resultant application. The method may further include use of a template of the desired application to build the resultant application. The template may have predefined parameters selected from the group consisting of guidelines, business logic requirements, business logic restrictions, architectural business process layering, business process layering hierarchal structure, individual layer hierarchy, and even combinations thereof In other embodiments of the invention the compliance may be computed as an amount of conformance of the actual business logic architecture hierarchy to the ideal business logic architecture hierarchy. Alternatively, the compliance may be computed as an amount of non-conformance of the actual business logic architecture hierarchy to the ideal business logic architecture hierarchy. Still further, the compliance may be computed as a percentage of compliance.

In one or more embodiments the methods may further include analyzing each of the one or more applications for common intra-application processes, and using the common intra-application processes to build the resultant application. A report of the compliance may also be generated and output to an end-user. In certain embodiments delegated and/or adaptation processes may be captured, stored in the middleware layer, and used to build the resultant application.

In various embodiments of the invention the resultant application may be modified if it is non-compliant to generate a modified application. Actual modified business logic hierarchy of this modified application may then be determined, followed by determining whether such actual modified business logic hierarchy complies with the ideal business logic architecture hierarchy. These methods may be repeated until an ideal resultant application is developed that has business logic hierarchal structure in compliance with the ideal business logic architecture hierarchy. In certain embodiments of the invention the method steps described herein may be implemented in a cloud-computing environment.

In other embodiments, the present invention is directed to a computer program product for assessing business logic architecture compliance in accordance with the methods described above and herein.

In still further embodiments, the invention is directed to a computer system for assessing business logic architecture compliance also in accordance with the methods described above and herein.

BRIEF DESCRIPTION OF THE SEVERAL VIEWS OF THE DRAWINGS

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION

Figure 1:
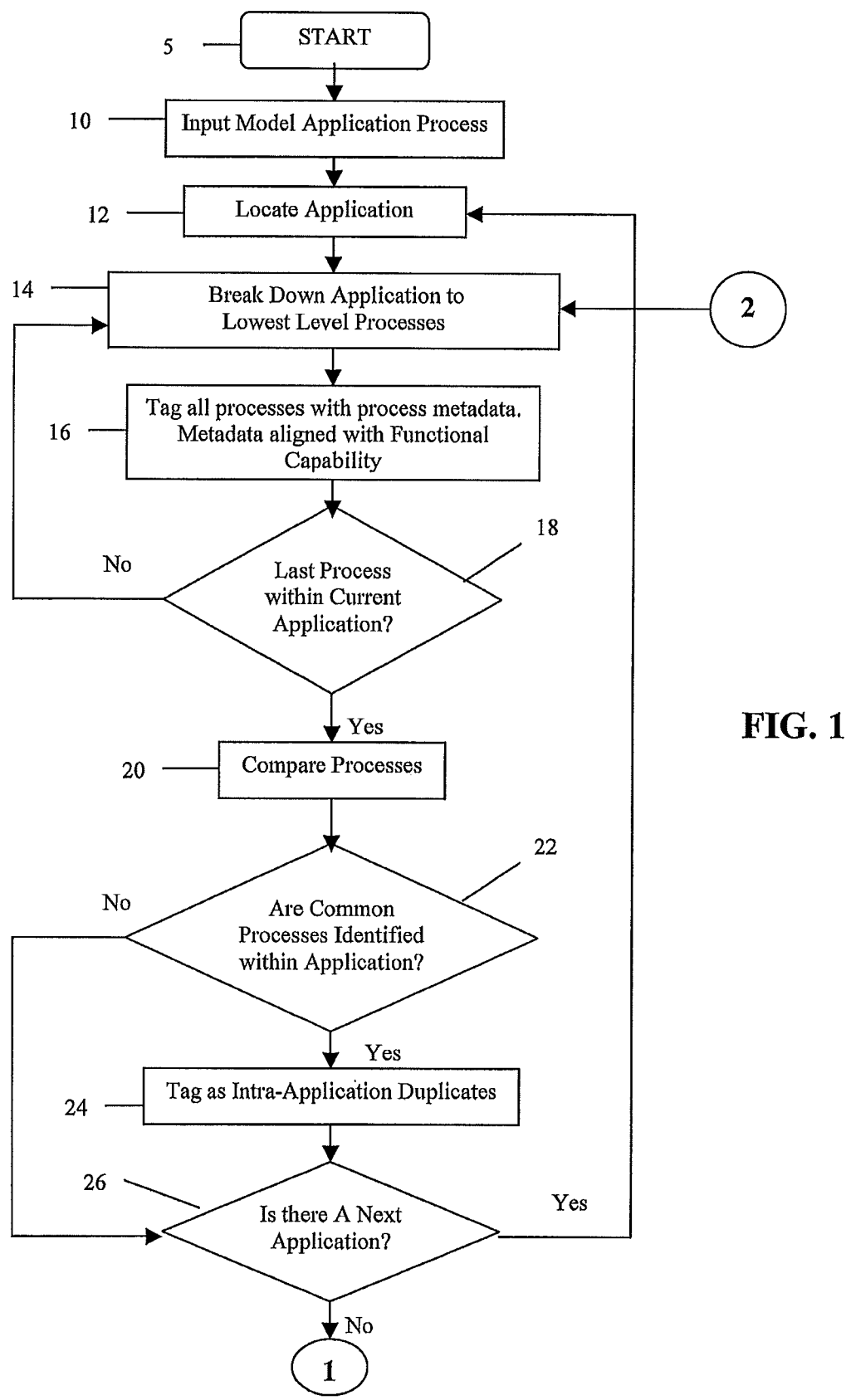
FIG. 1 illustrates a flowchart of an exemplary process flow of analyzing hierarchal layering in accordance with the various embodiments of the invention.

Reference is made herein to embodiments of the invention, However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative. Likewise, reference to "the invention" shall not be construed as a generalization of any inventive subject matter disclosed herein.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, and/or components, but do not preclude the presence or addition of one or more other features, integers, steps, operations, elements, components, and/or groups thereof.

A fundamental principle to Business Analytics and Optimization (BAO) largely relies in methods, systems and tools that effectively manage an enterprise's objectives, processes, data and information. In accordance with the invention it should be appreciated and understood that an enterprise may include, but is not limited to, a company, business, organization, and the like. BAO may be accomplished through an integrated ecosystem, such as, a Business Process Management (BPM). BPM enables enterprises to optimize business processes, reduce business cycle times, reduce operational costs and gain better alignment between business and information technology (IT). The business process layering of BPM may be provided through IT Web Services, such as, a Service-Oriented Architecture (SOA) software environment.

SOA is rooted in sound, layered architectural principles. It provides a working design or architecture of an enterprise's business principles and processes with detailed architectural diagrams, component descriptions, detailed requirements, design patterns, opinions about standards, patterns on regulation compliance, standards templates, and the like. In doing so, these layered architectural principles define and set forth processes and tasks on how information and transactions are to flow across various enterprise services and applications. Also, each layer within the layered architecture includes a hierarchy (i.e., workflow) of the processes and/or activities that are to be provided and accomplished by and within each of such layers.

In current integrated ecosystems, time gaps often undesirably exist during the process of implementing Web Services, such as, SOA software environments. These time gaps are partly due to confusion relating to ownership of processes and tasks, and much more due to confusion existing in the presence of a logic-oriented middleware software product performing orchestration and choreography of process and tasks. Typically, the middleware is viewed as being useful for merely routing and mediation purposes. In the problems surrounding ownership of processes and tasks, conflicts of interest often arise among different project teams not wanting to deal with these time consuming and costly problems. In addition thereto, application developers and owners, as well as middleware architects, are often of the opinion that such problems are not their responsibility.

Software applications have been developed to assign ownership of processes and tasks to minimize these time gaps. An example of such a program is Telecom Applications Map (TAM). TAM software provides Enterprise Application Integration (EAI) functionality for transport between applications, data format transformations and implementation. It also instructs BPM to define process orchestration and choreography for specifying ownership of processes within the application logic.

However, these known approaches for assigning ownership of processes and tasks via software (e.g., TAM) do not take into consideration, or provide guidelines for, assigning ownership of processes and/or tasks within the confines and requirements of layered architectural principles, as well as within the confines and limits of each layer hierarchy. That is, conventional methods and tools for assigning ownership of processes or tasks do not assess whether their respective assignment structures conform to, or comply with, predefined layered architectural principles and/or hierarchy, particularly within logic-oriented middleware environments. This is especially true when process components are common (i.e., the same) across two or more applications, or when processes are adaptive or delegated.

By not complying with set layered architectural principles and/or hierarchy in business analytic environments, and in particular those involving logic-oriented middleware, a common process might be duplicative in two different applications, thereby increasing operating expenditures. For example, the process AddressManagement might be used by both a Customer Billing application and a Customer fulfillment application. Also the results of such a chaotic environment within applications and middleware might cause a simple process (e.g., a product validation process), or a complex process (e.g., an order fulfillment process), to reside both within its respective application and be hosted in the logic-oriented middleware, which would cause competing resources that waste valuable time and money.

In an integrated ecosystem, it would be desirable to provide methods, systems and tools that assess whether assignment of ownership of processes and/or tasks adhere to layered architecture principles and/or hierarchy. This process assessment becomes critical in business analytics, particularly, in the adherence to layered architecture principles and hierarchy in environments involving logic-oriented middleware. By being able to perform such assessments, an end-user would understand the existing gaps in the layering principles (e.g., gaps in processed, tasks, etc.), and arrive at a maturity level, which in turn, relates to the operating expenditures (OPEX).

The various embodiments of the present invention provide methods, apparatus and systems that perform a systematic assessment of adherence (i.e., compliance) of process and task ownership assignments to layered architectural principles and/or hierarchy, particularly within logic-oriented middleware environments. These assessments of the invention indicate existing gaps within the application model layering, which are used to generate a maturity level of the developed application that is output in a report to an end-user.

As will be appreciated by one skilled in the art, aspects of the present invention may be embodied as systems, methods or computer program products. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, store, communicate, propagate, or transport a program for use by or in connection with an instruction execution system, apparatus, or device. Note that the computer usable or computer readable medium could even be paper or another suitable medium upon which the program is printed, as the program can be electronically captured via, for instance, optical scanning of the paper or other medium, then compiled, interpreted, or otherwise processed in a suitable manner, if necessary, and stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process. The instructions that execute on the computer or other programmable apparatus provide processes for implementing the functions/acts specified in the flowchart and/or block diagram block or blocks.

It should also be appreciated and understood that embodiments of the invention may be provided to end users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud that allow video and/or audio to be transferred from one window/tab to another window/tab.

For example, the hardware, software, networking, connectivity, services, etc. of the cloud computing environment provide a user with the online service(s) of continuously viewing a video regardless of the window/tab the user is viewing by transferring such video(s) from its original window/tab (e.g., from its original URL) to the window/tab that such user is currently viewing. Cloud computing identifies and locates the video to its exact source code within the source code of the window/tab on which such video resides, copies the source code of the video and uploads it to a window/tab that is currently being viewed by the user so that the user is provided with the service of viewing the video(s) in a non-occluded manner. When hosted in a cloud environment, browsers are modified to accept applications in the cloud environment for offering and implementing the services of the various embodiments of the invention.

Figure 2:
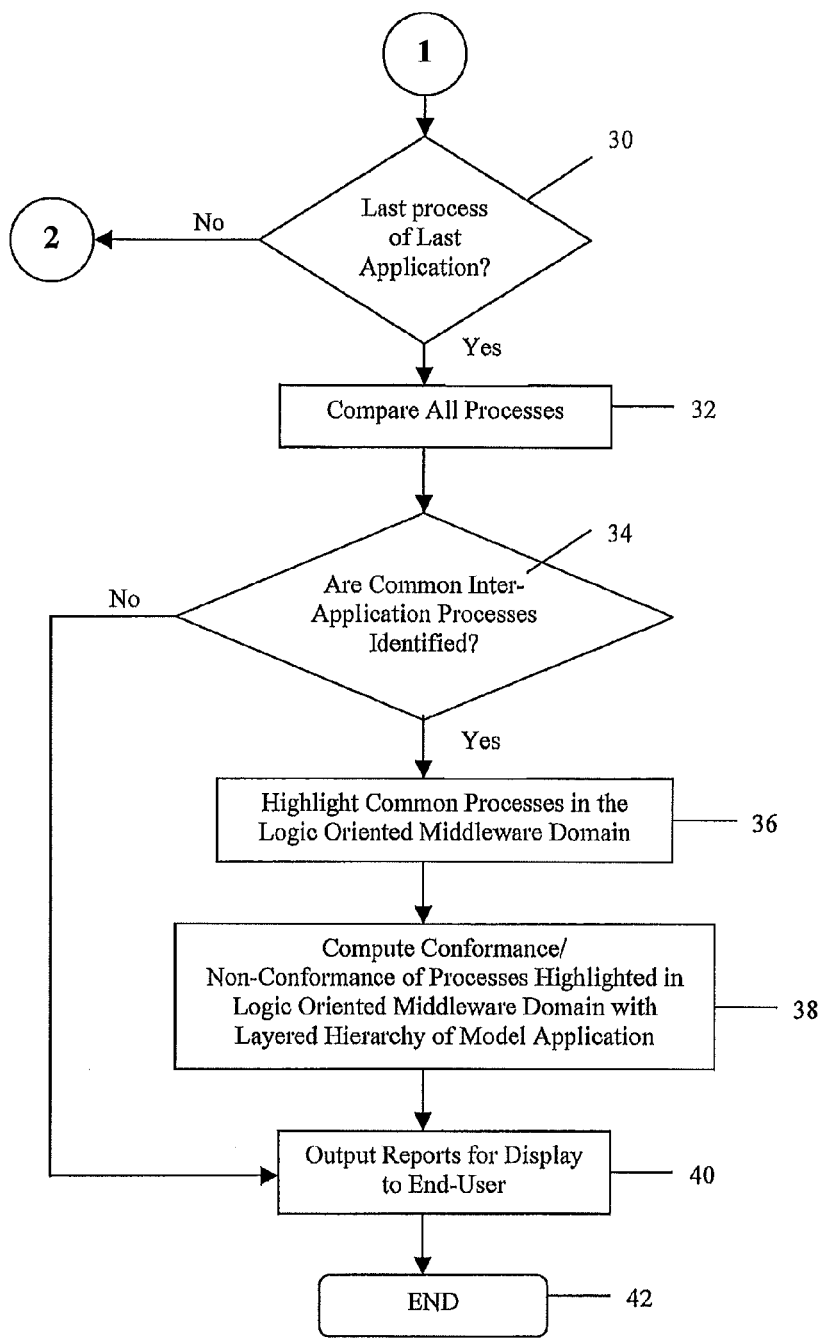
FIG. 2 illustrates a continued process flowchart of FIG. 1 of analyzing hierarchal layering in accordance with one or more embodiments of the invention.
Figure 3:
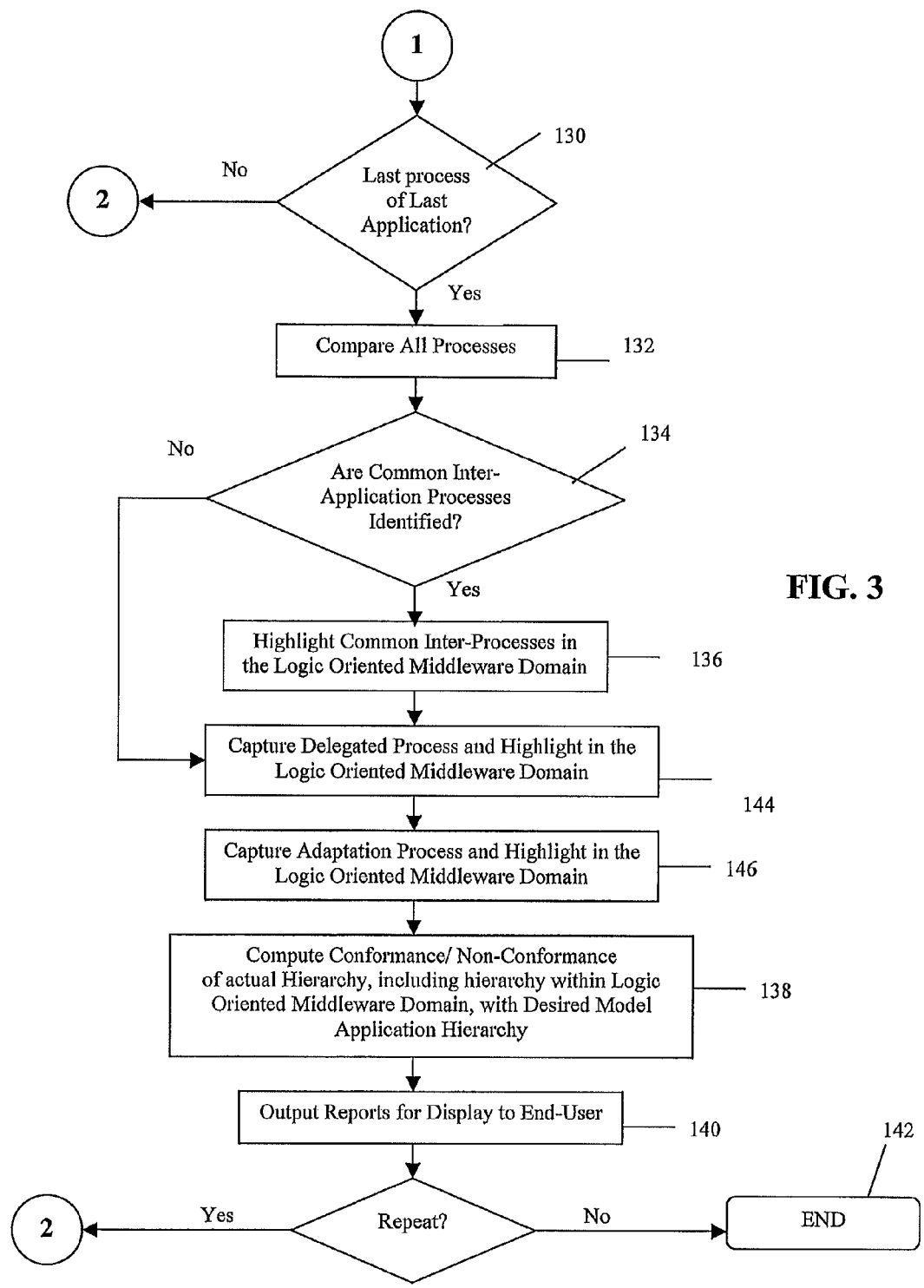
FIG. 3 illustrates a continued process flowchart of FIG. 1 of analyzing hierarchal layering in accordance with other embodiments of the invention.

Referring now to the drawings, FIGS. 1-3 show various embodiments of exemplary process flows of the present invention. As shown in FIG. 1, in one or more embodiments the process flow of the invention is started (step 5) and a Model Application Process ("Model Application") is generated and input into the present methods, systems and apparatus (step 10).

The Model Application may be provided as a template having predefined parameters including, but not limited to, guidelines, business logic requirements, business logic restrictions, architectural business process layering, business process layering hierarchy or hierarchal structure, individual layer hierarchy (i.e., the desired hierarchy within each layer of the process layering), and the like, and even any combination thereof. The predefined parameters are determined and selected by one or more entities (e.g., one or more BAO architects), whereby such parameters are chosen to meet the guidelines and requirements of a desired resultant application. The predefined parameters of the Model Application enable such a resultant application to perform, achieve and/or implement a desired end-result. In doing so, the predefined parameters are developed within a template to set forth the ideal layered architectural business logic principles and hierarchal structure for accomplishing the desired end-result of the desired application. These templates defining the parameters may be developed using a GUI based interface, whereby the end-user (e.g., a BAO architect) may either automatically import the business process structure, create it manually, or combinations thereof.

The methods, systems and apparatus of the invention continue by developing an application that conforms to the Model Application, i.e., meets the predefined parameters that set forth the ideal layered architectural business logic principles and hierarchal structure. The Model Application may be composed of a number of different small or large segments of services based on their functionality to form ad hoc applications, which may be built using existing software services and using logic-oriented middleware software domains. In one or more embodiments of the invention a plurality of applications may be joined together to form the resultant application, whereby each of these applications may perform one or more different, or alternatively similar, services or tasks. These joined applications preferably conform to, and/or comply with, the ideal layered architectural business logic principles and hierarchal structure of the predefined parameters.

In continuing with the process flow of one or more embodiments of the invention, a first of the applications required to develop the Model Application is located using the template (step 12), followed by breaking down such first application into its lowest level process or processes (step 14). This step of breaking down each identified and located application may also break down the applications into their respective lowest level sub-process(es) of each process.

Once the first located application is broken down into its lowest level of process(es) and/or sub-process(es), each of these process(es) and sub-process(es) are tagged with metadata (step 16). The process metadata may be aligned with the functional capabilities of the particular process or sub-process to enable identification of such capabilities during the process of developing the Model Application. The metadata may also describe the characteristics of each service, as well as its source code or data that drives the particular service.

The methods, systems and apparatus of the invention continue by determining whether or not the last process within the current application being analyzed has been reached (step 18). If it is determined that the last process or sub-process within the current application has been analyzed and tagged, then the process flow continues to step 20 (discussed below). If the current process being analyzed and tagged is not the final process or sub-process within the current application, then the process flow reverts back to the step of breaking down the current application to its lowest level process(es) and/or sub-process(es) (i.e., back to step 14). This step of reverting back to breaking down the current application ensures and confirms that such application is broken down to its lowest level of process(es) and/or sub-process(es) for the analysis thereof.

Once it has been determined that the current application is at its lowest level of process(es) and/or sub-process(es), and that the last process or sub-process of such application has been analyzed and tagged, all of these tagged processes and sub-processes are compared against one another (step 20). In doing so, all of the current application processes and sub-processes are compared against each other to locate any and all common processes and/or sub-processes within this current application (step 22). Common processes may be those processes and sub-processes that are the same as one another, or they may perform process steps that accomplish the same end-result. For instance, two or more processes may be the same or perform equivalent services or tasks, two or more sub-processes may be the same or perform equivalent services or tasks, or even a process and a sub-process may be the same as each other or perform equivalent services or tasks.

All common processes and/or sub-processes within the currently analyzed application are tagged with additional metadata that identifies such common processes/sub-processes as intra-application duplicates (step 24). The intra-application tag identifies all common processes and sub-processes within a given application uniquely and distinctly from common processes/sub-processes within another application. As such, each application will have its own intra-application tags that uniquely identify both the particular application in which such common processes/sub-processes reside, as well as their corresponding processes/sub-processes.

Once all the common intra-application processes/sub-processes are identified and tagged, it is then determined if there is another application (i.e., a Next Application) that is required to develop and complete the predetermined Model Application (step 26). Alternatively, if there are no common processes and/or sub-processes identified within the first application being analyzed (step 22), then the invention may proceed directly to locating other applications needed to build the desired Model Application (step 26) without tagging any common intra-application processes since there are none.

In the event it is determined that another application exists or is required for developing the ideal Model Application (step 26), then the process flow reverts back to locating and identifying a next application (step 12), followed by breaking down and tagging each subsequently located application into its lowest level processes/sub-processes (steps 14-18), and then comparing for commonality and further tagging common processes/sub-processes within each respective application (steps 20-24). In one or more embodiments of the invention, the process flow of steps 12-26 may be repeated until it is determined that no other applications are needed to build or complete the predetermined Model Application. At this point, the template of the predefined parameters has been fulfilled and completed, such that, one or more applications have been combined using a logic-oriented middleware domain to develop a new application that conforms and complies with the ideal layered architectural business logic principles and hierarchal structure of the Model Application. Again, for each application identified and processed, the intra-application commonality tags uniquely identify the processes/sub-processes within each respective application to the exclusion of other applications.

Referring to FIG. 2 which shows one or more embodiments of the present invention, upon a determination that no other applications are needed to build the desired Model Application (step 26), the process flow may continue by verifying that the previous process/sub-process analyzed within the previous application is in fact the last process of the final application (step 30). If it is not, or even if it is questionable as to whether or not it is the last process of the final application for building the Model Application, the process flow may revert back to breaking down the application currently being analyzed into its lowest level of processes and sub-processes (step 14) and continuing the process flow forward until it is determined that all applications, and all processes/sub-processes thereof, have been analyzed and tagged in accordance with the invention. This step verifies that the final application and its last process/sub-process has been analyzed prior to comparing each of the various applications used to develop the Model Application against one another.

In step 30, once it is verified that the last process of the final application has been identified and analyzed, the various analyzed and tagged processes and/or sub-processes within the different applications are compared against each other for commonality (step 32). In doing so, all the processes and sub-processes analyzed up to step 32 are preferably stored in a database and are retrieved from such database for further analysis thereof (see, steps 32 et al.). The methods, systems and apparatus of the invention compare each and every process to process, sub-process to sub-process, and even every process(es) to sub-process(es) across all of the different applications that were used to develop the Model Application. These different processes/sub-processes of the different applications are compared against each other to locate and identify common or duplicative inter-application processes/ sub-processes, which are then tagged using an identifier that uniquely identifies each process/sub-process as a common inter-application process. In accordance with one or more embodiments of the invention, these common inter-application processes/sub-processes may be stored in the logic-oriented middleware domain.

After all processes/sub-processes within the different applications have been compared to one another, and any and all common or duplicative inter-application processes/sub-processes identified and tagged, it is then determined whether or not any such common inter-application processes/sub-processes exist within the developed application (step 34). If there are no common inter-application processes, then the process flow continues directly to the step of generating a report that is output to the end-user (step 40). This report notifies the end-user that no common inter-application processes exist, which in turn, indicates to the end-user that each process/sub-process within the developed architectural structure is unique and not replicated or duplicated.

In the event it is determined that common or duplicative inter-application processes/sub-processes do exist within the different applications of the developed application (step 34), then these common inter-application processes/sub-processes are highlighted and stored in the logic-oriented middleware domain (step 36). These highlighted common inter-application processes are stored as a single occurrence to prevent a number of duplicative processes/sub-processes within the developed application, and in particular, to prevent duplicate processes from residing in the number of different applications that make up the developed application. This eliminates process redundancy and their corresponding services or functionalities.

By highlighting and storing common or duplicative inter-application processes/sub-processes, each as a single occurrence within the logic-oriented middleware domain, and sharing this single occurrence process/sub-process across multiple applications within the developed application, time is saved by not having to obtain the common inter-application processes from a number of different applications. Each common inter-application process is retrieved from the logic-oriented middleware domain to perform the services and/or tasks associated therewith so that the resultant developed application is provided with enhanced and improved functionality, as well as being efficiently operated within a timely manner.

The methods, systems and apparatus of the invention then analyze the stored common inter-application processes that are to be used in the various applications of the resultant developed application to ensure compliance with the predefined layered architectural business logic principles of the Model Application (step 38). That is, the various embodiments of the invention determine whether or not the stored single occurrence of the common inter-application processes, and the use thereof, meets the predetermined guidelines and requirements for the ideal hierarchal structure. Again the hierarchy within the layered architectural business logic is set to allow a desired workflow of the processes and sub-processes within each of the various applications. As such, not only does each application that is used to build the resultant application have its own hierarchy, the resultant application itself also has its own hierarchal structure that has been predetermined and defined within the Model Application template. All of this hierarchal structure ensures that the built resultant application achieves its end-goal.

In one or more embodiments, step 38 may be accomplished by obtaining data structure of the actual built application and each application that makes up the actual build, as well as retrieving the highlighted common processes/sub-processes from the logic-oriented middleware domain. Using this data structure the layered business logic hierarchal structure within each of these applications, and the hierarchal structure of the built resultant application, are retrieved and analyzed to develop an actual hierarchal structure build of both the actual built application and its applications used to build such actual build. Again, some of the building applications may implement use of the stored highlighted common inter-application processes.

The actual hierarchal structure builds are then compared against the original or ideal hierarchal structures of the individual applications and the Model Application template. In doing so, the built hierarchal structure of each individual application, and in particular, those applications implementing highlighted shared common inter-application process(es) retrieved from the logic-oriented middleware domain, are compared against a stored ideal hierarchal structure of such application. Each application may store data relating to its own original hierarchal structure that reflects the application's ideal hierarchal structure. The actual hierarchal structure build of the resultant developed application, including any highlighted shared common processes, is compared against the ideal hierarchal structure of the Model Application template.

These actual to ideal hierarchal structure comparisons determine an amount of deviation of the actual hierarchy build from the ideal hierarchy. The amount of deviation may be calculated as an amount of compliance (i.e., conformance) of the actual developed hierarchal structure to the ideal hierarchal structure. Alternatively, it may be calculated as an amount of non-compliance (i.e., non-conformance). For instance, either amount may be calculated as a percentage of compliance or non-compliance. One or more reports indicating this status compliance data may be generated and output to the end-user (step 40), at which point the process flow ends (step 42). The end-user may either accept the application, or modify the resultant application for any non-compliancy errors.

The output reports may be generated as maturity level reports represented as a percentage of compliance/non-compliance. These maturity levels indicate the state of development and compliance at which the developed application reside. For instance, a developed application that has a large amount of non-conformance to its ideal hierarchal plan may be at a low level of maturity since it will continue to need further IT development. Alternatively, an application that has been developed as identical, or closely identical, to the ideal hierarchal plan may have a high maturity level since such application is usable, operable and repeatable.

In one or more alternate embodiments of the invention, as shown in FIG. 3, once the last process of the last application has been detected (step 130), all process/sub-processes compared to one another (step 132) and common inter-processes identified and highlighted in the middleware (steps 134, 136), additional processes and/or sub-processes may be identified, highlighted and store in the middleware domain for use in accordance with the invention.

In various embodiments, delegated processes may be identified, located and stored in the logic-oriented middleware domain (step 144). These delegated processes may include a number of different processes or sub-processes, or at least define such processes, that are required for performing a predetermined delegated function. Adaptation processes may also be identified, located and stored in the logic-oriented middleware domain (step 146). These adaptation processes perform a necessary function to fulfill a process request in the hosting application. For instance, in an application that is not able to receive the entire data of a requested task, and the requester is not able to provide the missing information, then an adaptation process that has structure including the requested task can provide such structure and enrich the application with the requested task by extrapolation. For example, in an order fulfillment application termed as "ManageOrder" that can only receive the process "AddressStructure," if the consuming process is unable to provide "AddressStructure" then an adaptation process "AddressManagement" having "AddressID" (which includes "AddressStructure") may enrich the "ManageOrder" with the "AddressStructure."

Once the common inter-application processes are highlighted and stored in the middleware domain (see, steps 134, 136), and both delegated processes and adaptation processes are highlighted and stored in the middleware domain (see, steps 144, 146), the methods, systems and apparatus of the invention compute the compliance or non-compliance of the actual developed hierarchal structure to that of ideal or desired business logic hierarchy (step 138). Thereafter, reports of compliance or non-compliance are generated and output to the end-user (step 140). The process may be stopped (step 142), or if there is another application, or if the current application has been modified due to any corrected defects found therein, the process may be continually repeated. Also, if the end-user (e.g., a BAO architect) can not import a located process structure, such end-user may manually create a desired process structure to fulfill or rectify and voids in the desired resultant application.

Since certain applications have been altered by use of highlighted common inter-application processes shared from the middleware domain, various embodiments of the invention provide the end-user with the amount that such shared processes affect the ideal or desired structural hierarchies so that the end-user can correct any deficiencies prior to running the application. As such, while the invention not only removes redundancy of repeat processes/sub-processes to enhance operating times, it also enables the end-user to assess whether or not the shared common processes have deleteriously affected the process flow of any applications prior to utilizing the resultant application or any part thereof. This prevents the implementation of a defective program or application that has operational errors, which would undesirably lead to processing errors, slow operational times (i.e., processing downtime), waste human resources, increase operating expenditures, and the like.

Even if one process or sub-process contains errors or falls outside of its ideal or desired hierarchy, the entire process flow of the developed application can be undesirably affected. For example, in a program that requires an account with a customer ID to place an order, if the customer ID input falls outside of the ideal hierarchy pattern and a customer is allowed to upload an order without the customer ID being set up, then the entire order placed by the customer may have to be thrown out since there is no link between the order and the customer's customer ID. The customer may have to place the entire order again after the customer's customer ID has been entered into the system. This would waste the customer's time, and may even lead to customer loss. The various embodiments of the invention prevent such an occurrence since the methods, systems and apparatus check the developed application hierarchy structure prior to the running thereof to ensure all applications, sub-applications, processes and sub-processes are in the correct hierarchy order for the planned application operations.

One or more embodiments of the invention may also indicate the source of the non-compliance. The invention locates and identifies the sources of non-compliance which may include, but are not limited to, identifying an application in which the error exists, identifying a process within a particular application in which the error exists, identifying sub-process of an application process in which the error exists, any combinations of the foregoing, and the like. The identifications and sources of non-compliance error may be output in the generated report. By indicating the origin of the non-compliant hierarchal defect, ownership of such defects is automatically assigned. That is, the source or owner of a particular application having the defective hierarchy is identified upon identification of the defective or non-compliant hierarchal structure. This prevents wasting time by trying to determine who owns the responsibility of such defect.

Various embodiments of the invention may be implemented in a continuous manner. In particular, as end-user(s) detect hierarchal defects and correct such defects to generate a new modified resultant application, the methods, systems and apparatus of the invention may be implemented with these new modified resultant applications. The modified resultant applications are processed and analyze to determine whether or not their modified hierarchal structures comply with, or do not comply with, the ideal hierarchy structure of the desired business logic, and to what extent such compliance/non-compliance exists. Again, referring to FIG. 3, the invention may be repeated until a resultant application has been developed that fully complies with the desired business logic hierarchy. Also, once a defective process/sub-process has been located and its source of origin identified, various embodiments of the invention may provide suggestions for processes or sub-processes, which may be from other applications, that would remedy the problem of the defect.

Again, the foregoing steps of the invention may be performed prior to using, or otherwise implementing, the resultant developed application. However, it should also be appreciated and understood that the invention may be implemented during the running or operation of an application to ensure that its hierarchal structure conforms to the ideal hierarchy. In this manner, any operational delays or set backs detected while running or operating an application can be ruled out as being attributed to any non-compliance with business logic hierarchy structure. The application may be developed in domains and/or in the logic-oriented middleware, wherein logic-oriented middleware processes can be created using a predefined template. Thereafter, maturity level of the architecture as a percentage of non-compliance is calculated and reports are generated.

In accordance with the invention, one or more embodiments of the invention provide a systematic approach to assessing adherence to layered architectural principles for integration specific environments involving logic-oriented middleware by computing commonality of processes/sub-processes, and computing the actual layering hierarchy for inter-applications. The invention may also be implemented for intra-applications, or even a combination of both inter-applications and intra-applications. Various embodiments of the invention may be implemented with blue stack GUI based apparatus and tools (e.g., International Business Machines Corporation's blue stack tools like Rational Software Architect (RSA), or industry specific tools like Telecommunication Strategic Process Model (TSPM), etc.), and may be termed as a Layered Architecture Analyzer (LAA). The invention provides an open interface for the import of processes/sub-processes (e.g., common, adaptation and/or delegated), as well as allows manual creation of the process hierarchy. The methods, systems and apparatus of the invention enable effective analysis of the maturity level of an entity's process model conformance to layered architecture principles, thereby enabling the entity to control expenditures and operating costs.

Figure 4A:
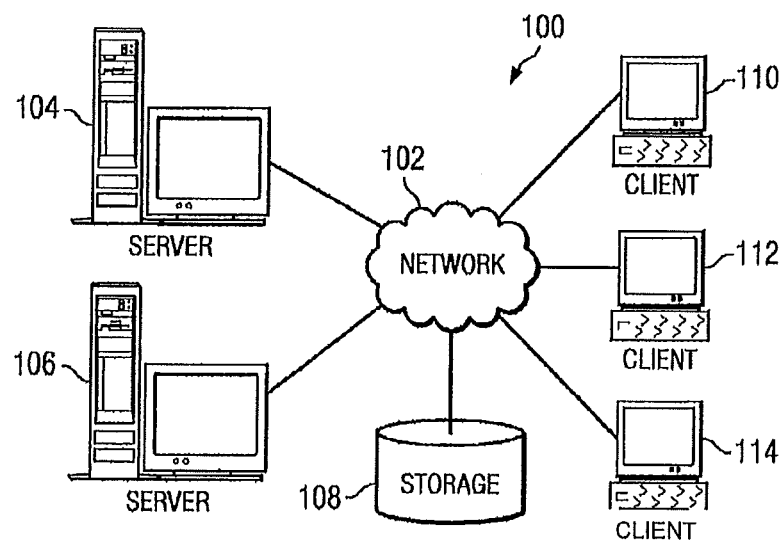
FIG. 4A illustrates a representation of a network of a data processing system in which embodiments of the invention may be implemented.
Figure 4B:
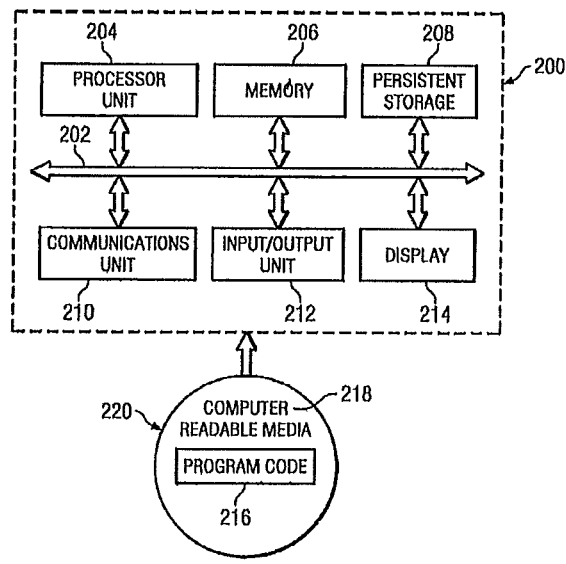
FIG. 4B illustrates a block diagram of a data processing system in which certain embodiments of the invention may be implemented.

Exemplary diagrams of data processing environments are shown in FIGS. 4A-B in which embodiments of the invention may be implemented. It should be appreciated and understood that these drawings are only exemplary and are not intended to assert or imply any limitation with regard to the environments in which different embodiments may be implemented. Many modifications to the depicted environments may be made.

A representation of a network of data processing systems in which embodiments of the invention may be implemented are shown in FIG. 4A. Network data processing system 100 may be a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 (e.g., personal computers or network computers) connect to network 102. The servers may provide data, such as boot files, operating system images, and applications to clients 110, 112, and 114. Network data processing system 100 may include additional servers, clients, and other devices not shown. The program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

Network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN), or within a cloud computing environment. Again, these figures are meant to be examples and not as an architectural limitation for the different illustrative embodiments.

The block diagram of FIG. 4B illustrates a data processing system of certain embodiments of the invention. The data processing system 200 is an example of a computer, such as server 104 or client 110 in FIG. 4A, in which computer usable program code or instructions implementing the processes may be located. The data processing system 200 may include communications fabric 202, which provides communications between processor unit 204, memory 206, persistent storage 208, communications unit 210, input/output (I/O) unit 212, and display 214.

A central processing unit (CPU) 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210 provides for communications with other data processing systems or devices. In these examples, communications unit 210 may be a network interface card. Communications unit 210 may provide communications through the use of either or both physical and wireless communications links. Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 may be located in a functional form on computer readable media 218 that is selectively removable and may be loaded onto or transferred to data processing system 200 for execution by processor unit 204. Program code 216 (i.e., instructions) and computer readable media 218 form computer program product 220 in these examples. The computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

Again, these examples of the data processing system 200 are not meant to be limiting. Rather, the data processing system 200 may be implemented in various forms. For example, data processing system 200 may be a computer, a workstation, a laptop computer, a mobile phone, a personal digital assistant, or some other suitable type of data processing system. The various embodiments of the invention may be implemented using any hardware device or system capable of executing program code.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of assessing business logic architecture compliance comprising:
   providing a computer system with business logic architecture in communication with a data repository through a middleware layer;
   defining an ideal business logic architecture hierarchy of a desired application;
   retrieving one or more applications from the data repository to develop the desired application;
   breaking down the one or more applications into a plurality of processes;
   analyzing the plurality of processes for common inter-application processes;

storing the common inter-application processes in the middleware layer;
developing the desired application using the one or more applications and the common inter-application processes from the middleware layer to provide a resultant application;
determining an actual business logic architecture hierarchy of the resultant application; and
computing compliance of the actual business logic architecture hierarchy to the ideal business logic architecture hierarchy.

2. The method of claim 1 wherein the business logic architecture comprises service-oriented architecture.

3. The method of claim 1 wherein a plurality of applications are retrieved from the data repository to develop the desired application.

4. The method of claim 1 wherein the one or more applications are further broken down into sub-processes, and analyzing the sub-processes for common inter-application processes that are used to build the resultant application.

5. The method of claim 1 further including a template of the desired application, and using the template to build the resultant application.

6. The method of claim 1 wherein the template has predefined parameters selected from the group consisting of guidelines, business logic requirements, business logic restrictions, architectural business process layering, business process layering hierarchal structure, individual layer hierarchy, and even combinations thereof.

7. The method of claim 1 wherein the compliance is computed as an amount of conformance of the actual business logic architecture hierarchy to the ideal business logic architecture hierarchy.

8. The method of claim 1 wherein the compliance is computed as an amount of non-conformance of the actual business logic architecture hierarchy to the ideal business logic architecture hierarchy.

9. The method of claim 1 wherein the compliance is computed as a percentage of compliance.

10. The method of claim 1 further including analyzing each of the one or more applications for common intra-application processes, and using the common intra-application processes to build the resultant application.

11. The method of claim 1 further including generating a report of the compliance, and outputting the report to an end-user.

12. The method of claim 1 further including capturing delegated processes, storing the delegated processes in the middleware layer, and using the stored delegated processes to build the resultant application.

13. The method of claim 1 further including capturing adaptation processes, storing the adaptation processes in the middleware layer, and using the stored adaptation processes to build the resultant application.

14. The method of claim 1 further including capturing both delegated and adaptation processes, storing the delegated and adaptation processes in the middleware layer, and using the stored delegated and adaptation processes to build the resultant application.

15. The method of claim 1 further including determining additional business logic architecture hierarchy of the applications used to build the resultant application, and determining compliance of the additional business logic architecture hierarchy of each application with a stored ideal hierarchy of each said application.

16. The method of claim 1 further including the steps:
modifying the resultant application to generate a modified application;
determining actual modified business logic hierarchy of the modified application; and
determining whether the actual modified business logic hierarchy complies with the ideal business logic architecture hierarchy.

17. The method of claim 16 further including repeating said method steps until an ideal resultant application is developed having business logic hierarchal structure in compliance with the ideal business logic architecture hierarchy.

18. The method of claim 1 wherein the method steps are implemented in a cloud computing environment.

19. A non-transitory computer program product for assessing business logic architecture compliance, the non-transitory computer program product comprising:
a non-transitory computer readable storage media;
first program instructions to define an ideal business logic architecture hierarchy of a desired application;
second program instructions to retrieve one or more applications from a data repository to develop the desired application;
third program instructions to break down the one or more applications into a plurality of processes;
fourth program instructions to analyze the plurality of processes for common inter-application processes;
fifth program instructions to store the common inter-application processes in a middleware layer;
sixth program instructions to develop the desired application using the one or more applications and the common inter-application processes from the middleware layer to provide a resultant application;
seventh program instructions to determine an actual business logic architecture hierarchy of the resultant application; and
eighth program instructions to compute compliance of the actual business logic architecture hierarchy to the ideal business logic architecture hierarchy,
wherein the first through eighth program instructions are all stored on the computer readable storage media.

20. A computer system for assessing business logic architecture compliance, the computer system comprising:
a central processing unit (CPU), a computer readable memory, and a computer readable storage media;
first program instructions to define an ideal business logic architecture hierarchy of a desired application;
second program instructions to retrieve one or more applications from a data repository to develop the desired application;
third program instructions to break down the one or more applications into a plurality of processes;
fourth program instructions to analyze the plurality of processes for common inter-application processes;
fifth program instructions to store the common inter-application processes in a middleware layer;
sixth program instructions to develop the desired application using the one or more applications and the common inter-application processes from the middleware layer to provide a resultant application;
seventh program instructions to determine an actual business logic architecture hierarchy of the resultant application; and
eighth program instructions to compute compliance of the actual business logic architecture hierarchy to the ideal business logic architecture hierarchy, wherein the first through eighth program instructions are all stored on the computer readable storage media for execution by the CPU via the computer readable memory.

* * * * *